United States Patent
Kotani et al.

(10) Patent No.: US 7,320,817 B2
(45) Date of Patent: Jan. 22, 2008

(54) HOLDING STRUCTURE AND A MOLDING WITH THE SAME

(75) Inventors: Wakana Kotani, Kariya (JP); Masahiro Kimura, Chiryu (JP); Katsuyoshi Shirai, Anjyo (JP); Eiichiro Iwase, Toyoake (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 206 days.

(21) Appl. No.: 10/855,739

(22) Filed: May 28, 2004

(65) Prior Publication Data

US 2004/0241358 A1 Dec. 2, 2004

(30) Foreign Application Priority Data

May 29, 2003 (JP) ............... 2003-153364
May 21, 2004 (JP) ............... 2004-151945

(51) Int. Cl.
*B29D 22/00* (2006.01)
*H01F 27/02* (2006.01)
*G01B 7/14* (2006.01)
*G01R 33/02* (2006.01)
*H01L 23/28* (2006.01)

(52) U.S. Cl. .................. 428/34.1; 428/68; 336/96; 324/207.16; 324/207.17; 324/244; 174/521

(58) Field of Classification Search ............... 428/34.1, 428/68, 172; 174/52.2, 207.17, 244, 521; 524/207.15, 207.16; 336/92, 96
See application file for complete search history.

(56) References Cited

U.S. PATENT DOCUMENTS

| 3,806,766 A * | 4/1974 | Fanning ............ 361/782 |
| 3,838,316 A | 9/1974 | Brown et al. |
| 4,213,106 A | 7/1980 | Egawa et al. |
| 5,412,532 A | 5/1995 | Nishimori et al. |
| 2003/0001566 A1* | 1/2003 | Tsuge et al. ........ 324/207.25 |

FOREIGN PATENT DOCUMENTS

| JP | 60-260138 | 12/1985 |
| JP | 9-38928 | 2/1997 |
| JP | 2002-141240 | 5/2002 |
| JP | 2003-14498 | 1/2003 |

OTHER PUBLICATIONS

European Patent Office Search Report, Oct. 2004.
* cited by examiner

*Primary Examiner*—Donald J. Loney
(74) *Attorney, Agent, or Firm*—Buchanan Ingersoll & Rooney PC

(57) ABSTRACT

A holding structure includes a held member located in a case, and a guiding space defined between the held member and a predetermined inner surface of the case. A primary molding resin is guided into the guiding space upon injection of the primary molding resin such that the held member is held in the case.

13 Claims, 9 Drawing Sheets

FIG. 11(a)
FIG. 11(b)
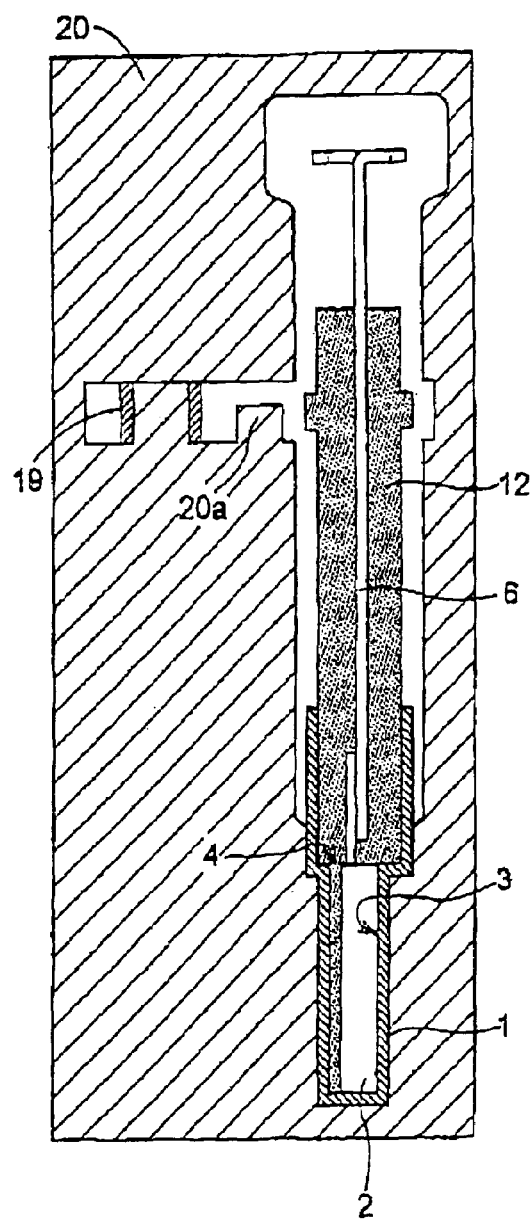
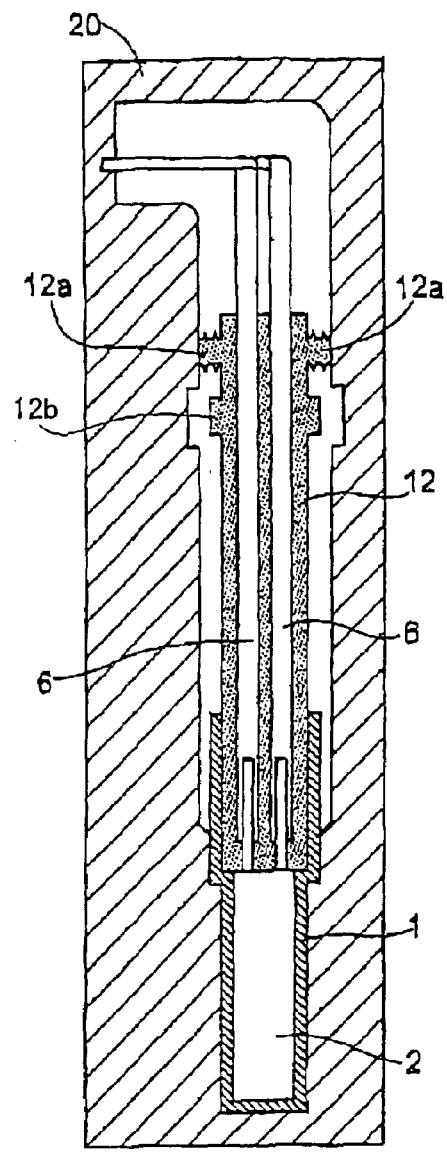
FIG. 11(c)
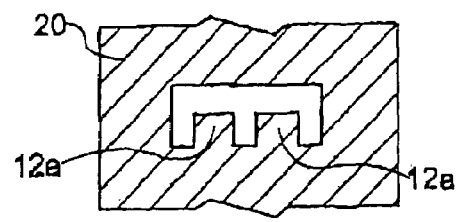

HOLDING STRUCTURE AND A MOLDING WITH THE SAME

CROSS REFERENCE TO RELATED APPLICATIONS

This application is based on and claims priority under 35 U.S.C. § 119 to Japanese Patent Applications 2003-153364, filed on May 29, 2003 and 2004-151945, filed on May 21, 2004, the entire content of which is incorporated herein by reference.

FIELD OF THE INVENTION

This invention generally relates to a method of forming a resin molding (a resin casting) by sealing a held member in resin. More particularly, this invention pertains to a holding structure for holding a held member inside a case and a molding (a casting) including the holding structure. The holding structure holds the held member located inside the case by injecting resin into a clearance between the held member and the case.

BACKGROUND

In a conventional semiconductor device, in order to protect a sensor IC and so on against an external environment such as dust, humidity, impact or the like, an injection molding is performed with ceramic material for air-tight sealing, with epoxy resin for resin sealing, or the like. Hereinafter, a vehicle speed sensor is taken as an example of resin moldings. Detecting precision of the vehicle speed sensor is largely influenced due to even slight fluctuation in a distance between a case surface and a detecting surface of the sensor IC. Therefore, requirements have lead to holding the sensor IC more accurately at a given position.

In general, if the sensor IC is sealed in resin under the condition that the sensor IC has been just located in the case, the sensor IC may be displaced from the given position. Therefore, performance of the semiconductor device may be deteriorated. In light of foregoing, a holding member has been conventionally applied for holding the sensor IC at an appropriate position inside the case, whereby the sensor IC is prevented from being displaced. The holding member is generally attached to a hole at a die surrounding the sensor IC, such that the holding member can hold the sensor IC at the given position. Resin is then injected into the die and molded therein. Accordingly, the sensor IC is sealed in the resin while the holding member retracts. In this case, the holding member should smoothly retracts from the case. For example, if the holding member is adjusted to move back from the case before charging a cavity with the molten resin, the sensor IC may displace due to flow of the molten resin. On the other hand, if the holding member is adjusted to move back from the case after charging the cavity with the molten resin, i.e., after the solidification of the resin, the resin does not reach holes at the holding member and a clearance between the resin and the holding member may be unnecessarily defined. This may cause deterioration of air tightness.

According to Japanese Patent Laid-Open Publication No. 1997-38982, resin is injected into a case while a held member is located inside the case and held by a holding member. The holding member can be moved back and forth relative to the case. This reference discloses a method of insert-molding the held member while the holding member is moved back from the case before charging the case with the resin or after thereof. According to the method of insert-molding the held member, a surface of the holding member in contact with the resin is heated by a heating device (a heating means). At least the holding member surface is heated up to a temperature higher than a surface of resin in contact with an inner surface of the case. Further, according to the method of insert-molding the held member, the resin only at the holding member is heated and molten by the heating device, and the holding member is moved back from the case. Therefore, it can effectively prevent the held member from displacing and avoid deterioration of airtightness.

However, the above-described method of insert-molding the held member requires the heating device and the holding device individually. Further, in order to heat the surface of the holding member in contact with the resin at a higher temperature than the surface of the resin in contact with the case, the heating device is required to be controlled appropriately.

Further, there may be a case that a main body and a flange portion are molded with a secondarily molding resin. The main body is molded for holding the case molded as described above. The flange portion is molded to laterally extend from the main body and is provided with an attaching hole.

A need exists for providing a holding structure capable of holding a held member such as a sensor IC at a given position when the held member is sealed in resin, and for providing a molding provided with the above-described holding structure. The holding structure can hold the held member at the given position with less manufacturing cost and power.

SUMMARY OF THE INVENTION

According to an aspect of the present invention, a holding structure includes a held member located in a case, and a guiding space defined between the held member and a predetermined inner surface of the case. A primary molding resin is guided into the guiding space upon injection of the primary molding resin such that the held member is held in the case.

It is preferable that the holding structure further includes a base surface defined in the case and being different from the predetermined inner surface of the case, and means for temporarily holding the held member relative to the base surface. The means for temporarily holding positions the held member relative to the base surface of the case and defines the guiding space between the held member and the predetermined inner surface of the case.

It is further preferable that the holding structure further includes an auxiliary member inserted into the case and to be connected to the held member. The means for temporarily holding is provided at the auxiliary member to push the held member on the base surface such that the held member is held by the means for temporarily holding. The means for temporarily holding in this case is an arm portion. The case can be provided with a contact portion defined at the case. The means for temporarily holding comes in contact with the contact portion and pushes the held member on the base surface.

According to another aspect of the present invention, a molding with the holding structure molded with the primary molding resin includes a main body molded with a secondary molding resin to hold the case, a flange portion molded with the secondary, molding resin laterally extending from the main body and having an attaching hole, and at least one hole defined at a flange base portion side of the flange portion rather than at the attaching hole side thereof.

It is preferable that the with the holding structure molded with the primary molding resin further includes a holder portion molded with the primary molding resin, and at least a holder contact portion provided at the holder portion and being in contact with an inner surface of a secondary molding die so as to position the holder portion relative to the main body. The primary molding resin can correspond to the secondary molding resin.

BRIEF DESCRIPTION OF THE DRAWINGS

The foregoing and additional features and characteristics of the present invention will become more apparent from the following detailed description considered with reference to the accompanying drawings, wherein:

FIGS. 11(a), 11(b), and 11(c) are cross sectional views illustrating a secondary molding process for a molding according to the embodiments of the present invention;

DETAILED DESCRIPTION

A holding structure according to embodiments of the present invention is applied to a vehicle sensor for detecting a vehicle speed based upon fluctuation of magnetic force of a pulsar ring. A held member in the holding structure is a sensor IC 2. The sensor IC 2 can detects the fluctuation of the magnetic force of the pulsar ring, on a peripheral edge portion of which South Pole and North Pole are alternatively arranged, or can detect the presence and absence of a gear rotor tooth.

The vehicle speed sensor as the molding includes sensor components such as a case 1 housed inside a die 10, the sensor IC 2, and an output terminal 6. The case 1, the sensor IC 2, and the output terminal 6 are substantially integrally sealed in resin. Polyamide resin can be applied as the resin injected into the case 1 as a non-limiting example. The injected resin can be, hereinafter, referred to as a primary molding resin.

Next, the holding structure according to a first embodiment of the present invention is described hereinbelow with reference to FIGS. 1 through 4.

Figure 1A:
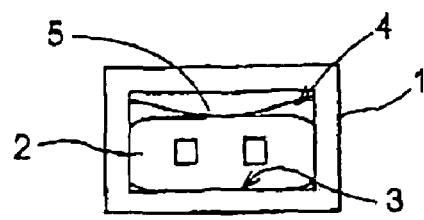
FIGS. 1(a), 1(b), and 1(c) are cross sectional views illustrating a case housing a sensor IC therein according to a first embodiment of the present invention.
Figure 1B:
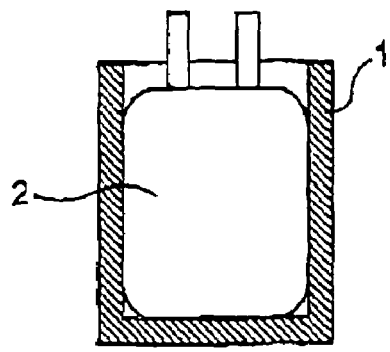
Figure 1C:
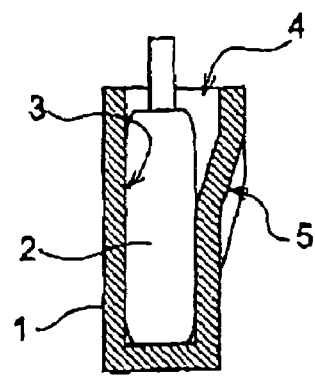
Figure 4:
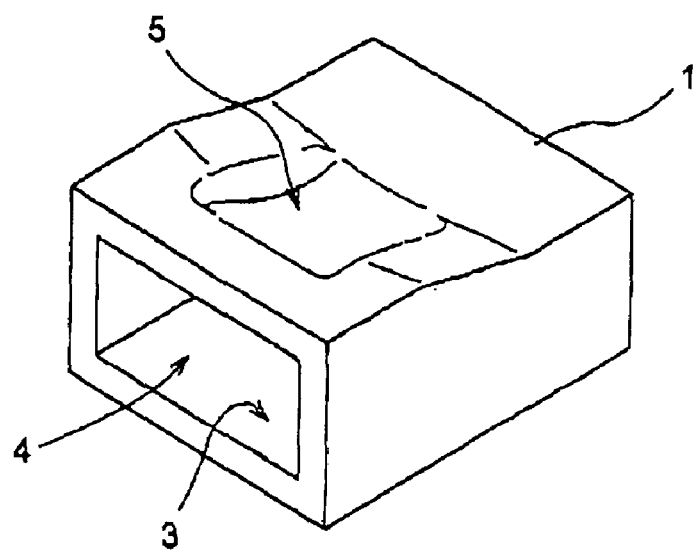
FIG. 4 is a perspective view illustrating the case according to the first embodiment of the present invention.

As illustrated in FIGS. 1 and 4, the case 1 has a substantially rectangle shape in which an opening portion of the case 1 is wider than a bottom portion thereof. As illustrated in FIGS. 1(a) and 1(c), a guiding space 4 is defined between the sensor IC 2 and a surface (i.e., a predetermined inner surface) opposed to a base surface 3 under a condition that the sensor IC 2 has been located inside the case 1. The sensor IC 2 is in contact with the base surface 3 and the surface opposed thereto within a vertical range between the bottom of the sensor IC 2 and a one-third height thereof and is held at least by these two surfaces.

As illustrated in FIG. 1(c) and FIG. 4, a convex portion 5, i.e., means for temporarily holding, is defined below the guiding space 4 and projects towards the inside of the case 1. More particularly, the convex portion 5 projects curving towards the inside of the case 1. The sensor IC 2 has been biased and pushed on the base surface 3 by an elastic force of the convex portion 5 while the sensor IC 2 has been located inside the case 1. Therefore, the held member such as the sensor IC 2 can be held at an appropriate position more reliably. The convex portion 5 is adjusted to be moved back towards an outside of the case 1

Next, following explanation will be given for explaining resin-sealing according to the first embodiment of the present invention with reference to FIGS. 2 and 3.

Figure 2:
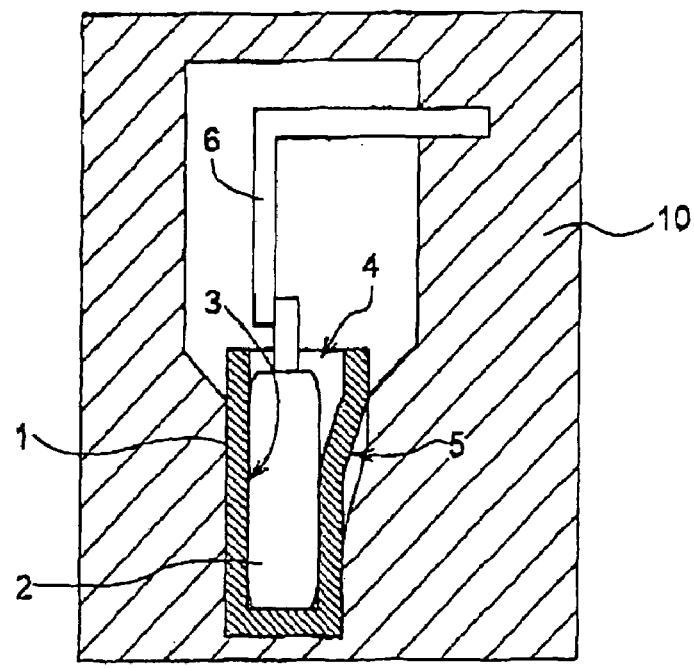
FIG. 2 is a cross sectional view illustrating a process for sealing sensor components in a resin according to the first embodiment of the present invention.
Figure 3A:
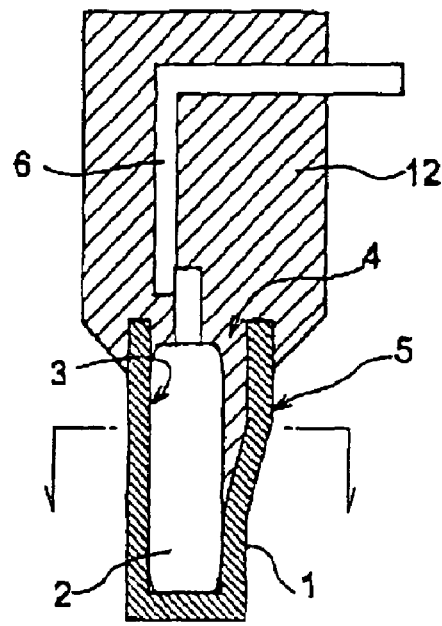
FIGS. 3(a) and 3(b) are cross sectional views illustrating the sensor components sealed in the resin according to the first embodiment of the present invention.
Figure 3B:
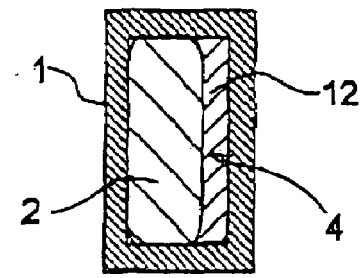

As illustrated in FIG. 2, the case 1 is located at a bottom portion of the die 10. The sensor IC 2 is housed inside the case 1 to bring a detecting surface of the sensor IC 2 in contact with the base surface 3 while the sensor IC 2 has been engaged and substantially integrated with the output terminal 6. The primary molding resin is then injected into the guiding space 4. The convex portion 5 is gradually and elastically deformed towards the outside of the case 1 along with the injection of the primary molding resin. The convex portion 5 is deformed as illustrated in FIG. 3 when the guiding space 4 is completely charged with the resin. At this time, the pushing force of the convex portion 5 has been still applied to the held member such as the sensor IC 2. Therefore, the primary molding resin injected into the guiding space 4 pushes the sensor IC 2 towards the base surface 3, thereby enabling to effectively prevent the displacement of the sensor IC 2 in the case 1. Further, the primary molding resin does not flow into a clearance between the base surface 3 and the sensor IC 2, wherein the sensor IC 2 can tightly come in contact with the base surface 3. As described above, the sensor components such as the case 1, the sensor IC 2, and the output terminal 6 are integrated and are sealed by a holder portion 12 solidified with the primary molding resin, so that the sensor with the above-described structure can be manufactured.

For example, when a holding member is used for sealing the held member such as the sensor IC 2 in the resin, the held member may be displaced due to the resin flow if the holding member is moved back from the case before solidification of the resin. On the other hand, the resin may not flow into a hole of the holding member if the holding member is moved back from the case after the resin solidification. In this case, the air-tightness in the resin may be deteriorated. As another example, when the resin only around the holding member is molten by a heating device and the holding member is moved back from the case, the displacement of the held member or the deterioration of the air-tightness may be able to be reduced. However, the manufacturing cost and hours may be increased.

In light of foregoing, according to the first embodiment of the present invention, the held member is positioned relative to the predetermined surface in the case 1, with the above-described structure. Further, the resin injected into the guiding space 4 pushes the held member such that there is substantially no clearance between the held member and the base surface 3. Therefore, the held member car be more accurately positioned in the case 1. According to the first embodiment of the present invention, the holding member is not required additionally. The sensor IC 2 can be hence sealed in the resin and positioned at an appropriate position without increasing manufacturing cost. Further, since the holding member is not required, the air-tightness in the resin can be highly achieved.

In the vehicle speed sensor as a non-limiting example, it is necessary to equally maintain a distance between the detecting surface of the sensor IC 2 and the base surface 3 of the case 1 in order to preferably assure the detecting precision and the sensor response. According to the first embodiment of the present invention, the means for temporarily holding is provided for positioning the sensor IC 2 by bringing the sensor IC 2 in contact with the base surface 3 of the case 1 and for defining the guiding space 4 for guiding the resin between the sensor IC 2 and the surface opposed to the base surface 3. Therefore, the distance between the sensor IC 2 and the base surface 3 can be equally assured with less loss of gap. Further, the held member such as the sensor IC 2 can be sealed in the resin with a simple Structure without deteriorating the detecting precision.

Next, a holding structure according to a second embodiment of the present invention is described hereinbelow with reference to FIGS. 5 through 8.

Figure 5A:
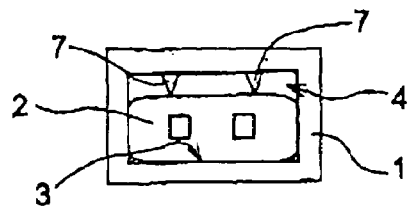
FIGS. 5(a), 5(b), and 5(c) are cross sectional views illustrating a case housing the sensor IC therein according to a second embodiment of the present invention.
Figure 5B:
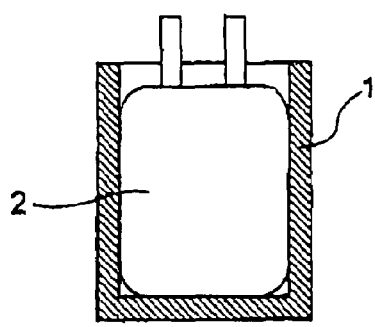
Figure 5C:
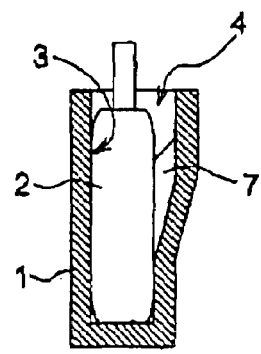
Figure 8:
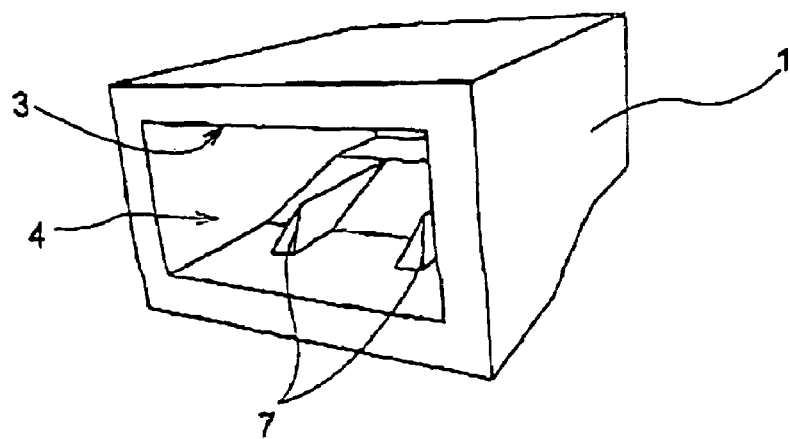
FIG. 8 is a perspective view illustrating the case according to the second embodiment of the present invention.

As illustrated in FIGS. 5 and 8, the case 1 has a substantially rectangle shape in which the opening portion of the case 1 is wider than a bottom portion thereof, in the same manner as the first embodiment. As illustrated in FIGS. 5(a) and 5(c), the guiding space 4 is defined between the sensor IC 2 and the surface opposed to the base surface 3 under the condition that the sensor IC 2 has been located inside the case 1. The sensor IC 2 is in contact with the base surface 3 and the surface opposed thereto from the bottom of the sensor IC 2 to a one-thirds height thereof and is held at least by these two surfaces.

As illustrated in FIGS. 5(a), 5(c), and 8, two ribs 7, i.e., the means for temporarily holding, are provided at an approximately central portion of the surface opposed to the base surface 3. Tip ends of the ribs 7 extend towards the base surface 3. The tip ends thereof come in contact with the sensor IC 2 and push the sensor IC 2 on the base surface 3 while the sensor IC 2 has been located in the case 1. According to the second embodiment of the present invention, the two ribs 7 are arranged near the opening portion of the case 1. However, the number of ribs and the structure thereof are not limited to the above description. That is, the ribs can be arranged at both side surfaces of the case 1. The ribs 7 can be provided at the appropriate number to support the sensor IC 2.

Next, following explanation will be given for explaining resin-sealing according to the second embodiment of the present invention with reference to FIGS. 6 and 7.

Figure 6:
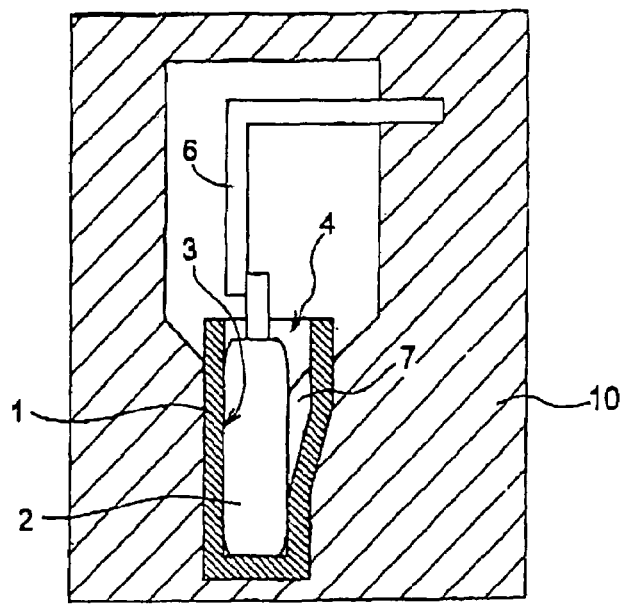
FIG. 6 is a cross sectional view illustrating a process for sealing sensor components in a resin according to the second embodiment of the present invention.
Figure 7A:
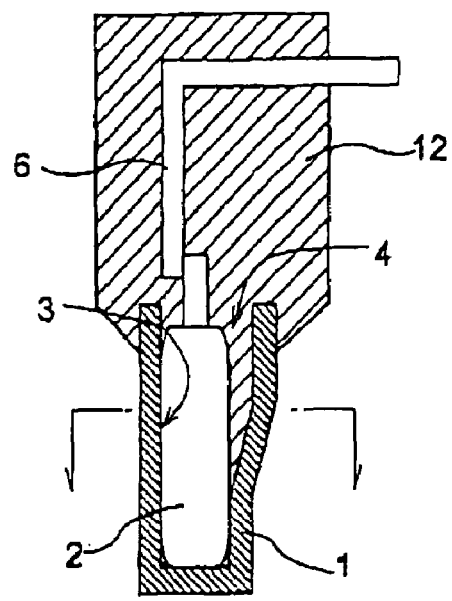
FIGS. 7(a) and 7(b) are cross sectional views illustrating the sensor components sealed in the resin according to the second embodiment of the present invention.
Figure 7B:
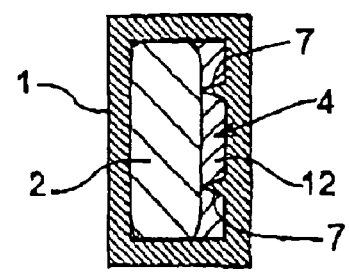

As illustrated in FIG. 6, the case 1 is located at the bottom portion of the die 10. The sensor IC 2 is housed inside the case 1 to bring the detecting surface of the sensor IC 2 in contact with the base surface 3 while the sensor IC 2 has been engaged and substantially integrated with the output terminal 6. The primary molding resin is then injected into the guiding space 4. The molten primary molding resin flows around the ribs 7 and travels to the lower side of the guiding space 4 over the ribs 7. The primary molding resin pushes the sensor IC 2 on the base surface 3 when the guiding surface 4 is charged with the primary molding resin.

According to the second embodiment, some other effects can be generated in addition to the above-described effects according to the first embodiment of the present invention. For example, the case 2 is provided with the two ribs 7. The ribs 7 can effectively increase the intensity of the case 1.

Next, the holding structure according to a third embodiment of the present invention is described hereinbelow with reference to FIGS. 9 and 10.

According to the first embodiment, the case 1 is provided with the convex portion 5 as the means for temporarily holding at the predetermined position of the case 1. According to the second embodiment, the case 1 is provided with the ribs 7 as the means for temporarily holding at the predetermined position of the case 1. According to the third embodiment, a portion of an auxiliary member 11 is applied as the means for temporarily holding.

Figure 9:
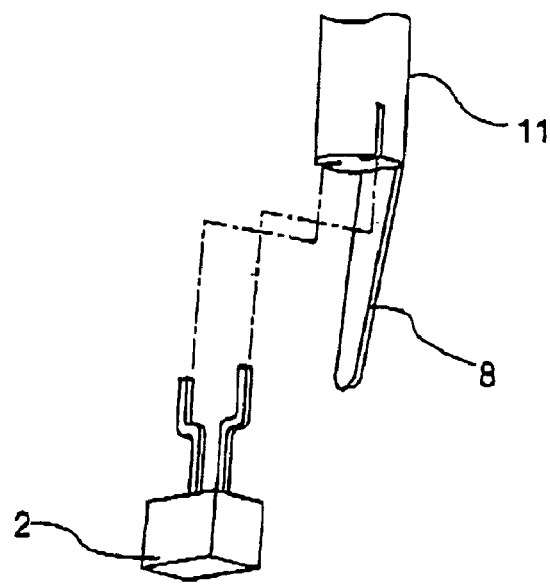
FIG. 9 is a perspective view illustrating an auxiliary member according to a third embodiment of the present invention.

As illustrated in FIG. 9, the auxiliary member 11 is provided with an arm portion 8 (i.e., the means for temporarily holding) at a tip end thereof. A length of the arm portion 8 to be inserted into the case 1 is designed so as to bring a tip end of the arm portion 8 in contact with the sensor IC 2 under a condition that the sensor IC 2 has been engaged with the auxiliary member 11. The arm portion 8 according to the third embodiment of the present invention is a leaf spring member as a non-limiting example. The sensor IC 2 is pushed on the base surface 3 by an elastic force of the arm portion 8. Further, the auxiliary member 11 includes at least a connecting terminal (not illustrated) connected with the output terminal 6. Therefore, a member for transmitting a detected result by the sensor IC 2 does not have to be separately provided, thereby enabling to reduce the number of components. Still further, as illustrated in FIG. 10, the case 1 is provided with a contact portion 9, which is adjusted to come in contact with the arm portion 8 of the auxiliary member 11, under a condition that the sensor IC 2 and the auxiliary member 11 are substantially integrally inserted into the case 1.

Figure 10:
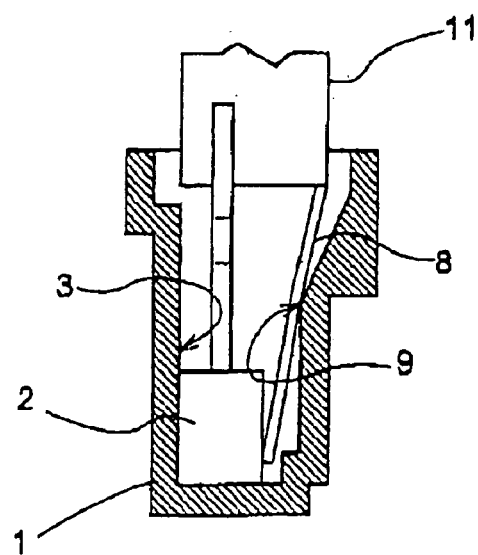
FIG. 10 is a schematic view illustrating a holding structure according to the third embodiment of the present invention.

As illustrated in FIG. 10, while the sensor IC 2 integrated with the auxiliary member 11 has been inserted into the case 1, the arm portion 8 is curved towards the sensor IC 2 by the contact portion 9. The tip end of the arm portion 8 comes in contact with the sensor IC 2 when the sensor IC 2 is located at the predetermined position. That is, the arm portion 8 is supported by the auxiliary member 11 and the contact portion 9 and pushes the sensor IC 2 on the base surface 3.

The primary molding resin is then injected into the case 1 having the above-described structure. The resin injection is performed substantially in the same manner as the first and second embodiments. Therefore, the sensor IC 2 can be sealed in the resin while the pushing force of the arm portion 8 has been subjected to the sensor IC 2, thereby enabling to effectively avoid displacement of the sensor IC 2.

Further, the means for temporarily holding corresponds to the arm portion 8 that has a simple structure. Therefore, the sensor IC 2 can be positioned at the appropriate position with the simple structure. Further, the held member such as the sensor IC 2 is positioned by the auxiliary member 11. Therefore, the case 1 can be a conventional case.

According to the first and second embodiments of the present invention, the sensor IC 2 is sealed in the resin while already being engaged with the output terminal 6. Alternatively, the present invention is not limited to the above-described structures. More particularly, the output terminal 6 is not necessarily required, and any other member can be provided.

According to the first, second, and third embodiments, the case 1 houses the single sensor IC 2. Alternatively, the case 1 can house plural sensors IC, and the shape of the case 1 can be different from the above-described rectangular shape.

According to the third embodiment, the arm portion 8 is the leaf spring member. Alternatively, the arm portion 8 can be a rigid body. In this case, the contact portion 9 can include elastic force and push the arm portion 8 on the sensor IC 2.

Further, according to the third embodiment, the auxiliary member 11 is provided with the connecting terminal to be connected with the output terminal of the sensor IC 2. Alternatively, the connecting terminal is not necessarily provided in the auxiliary member 11. In this case, any other member can be provided and be sealed in the resin with the sensor IC 2.

In whichever alternatives described above, the present invention can be effectively achieved.

Next, a molding according to the embodiments of the present invention is described hereinbelow with reference to FIGS. 11 through 15.

The vehicle speed sensor as the molding according to the first, second and third embodiments of the present invention is provided with the sensor components such as the case 1, the output terminal 6, and the sensor IC 2. These sensor components are sealed in the holder portion 12 and are integrated therein. The vehicle sensor is formed by insert-molding the sensor components with a secondary molding resin.

Figure 13A:
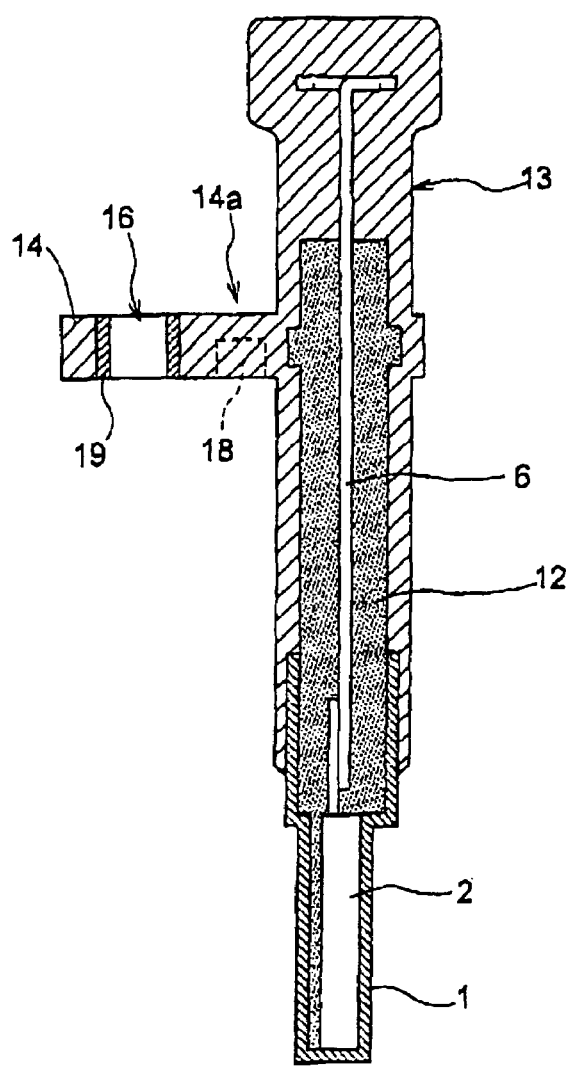
FIGS. 13(a), 13(b), and 13(c) are sectional views illustrating a schematic view of the molding.
Figure 13B:
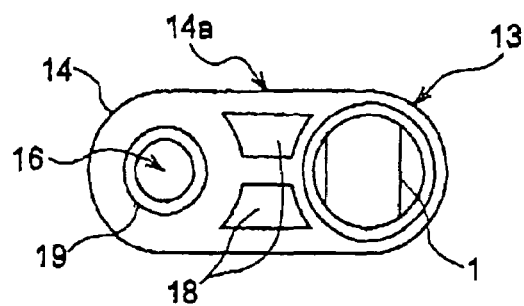
Figure 13C:
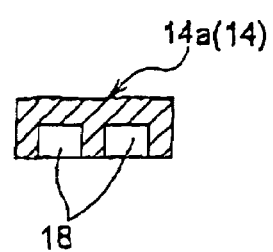

More particularly, as illustrated in FIG. 11, the sensor components molded with the primary molding resin as described above is located inside the die 20 for secondary-molding. The secondary molding resin is injected into the inside of the die 20, wherein the vehicle sensor according to the embodiments of the present invention can be molded. As illustrated in FIG. 13, the vehicle sensor as the molding includes a main body 13 and a flange portion 14. The main body 13 is formed to hold the case 1. The flange portion 14 is formed laterally extending from the main body 13 and is embedded with an attaching hole 16. The attaching hole 16 is defined at the flange portion 14 while a medal made sleeve 19 is arranged in the die 20 upon the secondary-molding.

Die projecting portions 20a are defined at an inner surface of the die 20 at a flange base portion 14a. The flange base portion 14a is near the main body 13 rather than the attaching hole 16. With the secondary molding resin flowing in a cavity of the die 20, a secondary molding is cut along the die projecting portions 20a so as to define holes 18. Each of the holes 18 is a concave shape or a: hole without a bottom. Further, a thick portion 12b integrally surrounds an outer peripheral surface of the holder portion 12 substantially at a height of the flange portion 14. In this case, the thickness of the secondary molding resin at the flange base portion 14a becomes substantially equal. Therefore, the secondary molding resin at the flange base portion 14a can substantially equally cooled. Further, the flange base portion 14a and the other portions of the main body 13 can be substantially equally cooled. In this case, the flange base portion 14a can be effectively prevented from being deformed or cambered. Further, occurrence of a surface sink on the flange base portion 14a can be effectively prevented. Therefore, the detecting precision and response of the vehicle sensor can be prevented from being deteriorated due to the displacement of the attaching hole 16 of the flange portion 14 relative to the sensor IC 2.

The holes 18 are defined to have concave shapes at a surface of the flange portion 14, respectively. Alternatively, the holes 18 can be holes without a bottom as illustrated in FIG. 15, respectively.

Figure 14A:
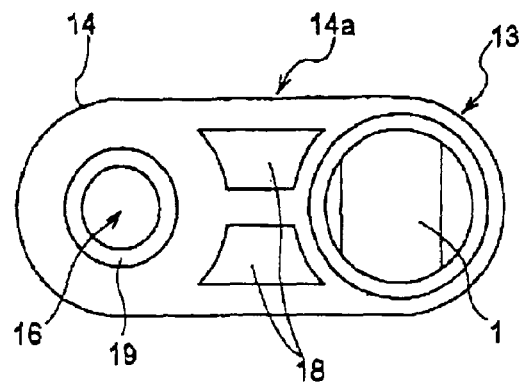
FIGS. 14(a) and 14(b) are a different mode of a hole of the molding.
Figure 14B:
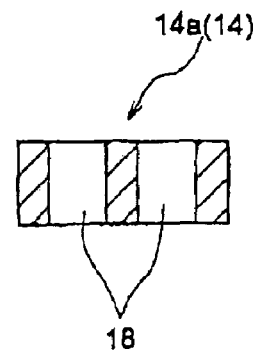
Figure 15A:
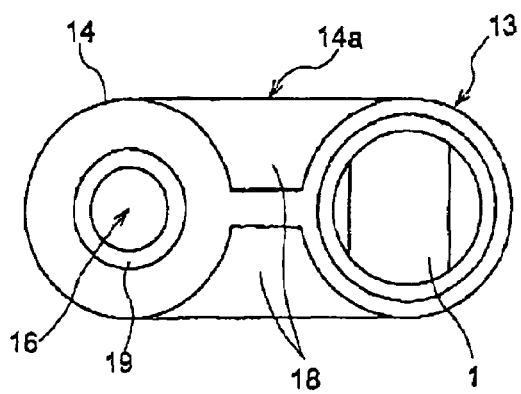
FIGS. 15(a) and 15(b) are a further different mode of the hole of the molding.
Figure 15B:
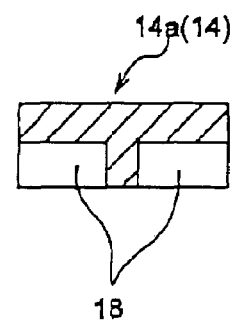

Further, as illustrated in FIGS. 13 through 15, the thickness of the secondary molding resin at the flange base portion 14a is approximately even. Further, the holes 18 are substantially symmetrically arranged relative to a central axis of the flange portion 14 extending at right angles relative to an axis of the main body 13. Therefore, a solidifying speed of the secondary molding resin at one side of the flange base portion 14a relative to the central axis thereof can be substantially equal to the one at the other side thereof, thereby enabling to more effectively prevent the camber or the surface sink of the flange base portion 14a.

Further, as illustrated in FIG. 11(b), a holder contact portion 12a is provided at the holder portion 12 and extends radially outwardly towards an inner surface of the metal made die 20 from the holder portion 12. The holder contact portion 12a determines a position of the holder portion 12. According to the embodiments of the present invention, the holder portion 12 is provided with the two holder contact portions 12a as two column bodies. Therefore, the sensor components sealed in the holding portion 12 with the output terminal 6 can be effectively prevented from rattling in the die 20 by the secondary molding resin flow in the die 20, thereby enabling to more effectively avoid the displacement between the attaching hole 16 and the sensor IC 2.

More particularly, the case 1 housing the sensor IC 2 therein is fit into the inner surface of the die 20 such that an outer surface of the case 1 surrounding the sensor IC 2 is not covered with the secondary molding resin. As illustrated in the drawings, when the holder portion 12 extends and projects at a relatively long distance from the opening portion of the case 1, there may a case that the holder portion 12 rattles in the die 20 due to the injection pressure of the secondary molding resin. In light of foregoing, the holder contact portion 12a of the holding portion 12 can accurately determine the position of the holder portion 12 in the die 20 and can effectively prevent the holder portion 12 from rattling therein. Therefore, in the vehicle speed sensor after the secondary molding process, the displacement between the attaching hole 16 and the sensor IC 2 can be more effectively prevented.

As illustrated in FIG. 11(b), in order to prevent rattling of the sensor components in the metal made die 20, it is preferable that the holder contact portions 12a be arranged relatively away from the case 1, i.e., be arranged away from the flange portion 14.

Figure 12:
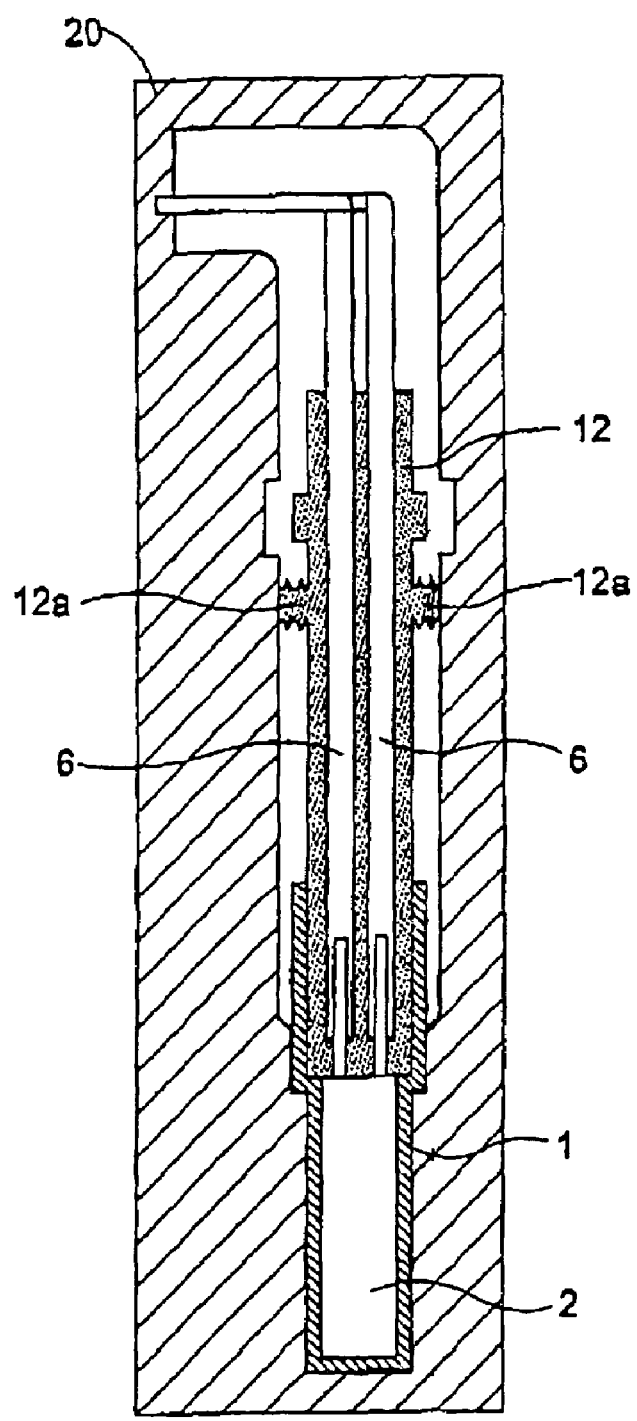
FIG. 12 is a cross sectional view illustrating a different mode of the secondary molding process illustrated in FIG. 11.

As illustrated in FIG. 12, it is also preferable that the holder contact portions 12a be arranged relatively close to the case 1 rather than close to the flange portion 14.

As illustrated in FIGS. 11(b) and 12, wedge projections can be defined at an outer surface of the holder contact portions 12a. In this case, the wedge projections of the holder contact portions 12*a* is molten by a heat of the secondary molding resin. Therefore, a boundary face between the secondary molding resin and the holder portion 12 becomes less. The holder portion 12 can be hence sealed by the molten resin. In this case, the holder portion 12 can be more effectively bonded with the main body 13 made of the secondary molding resin. Therefore, the sensor components can be effectively prevented from being exposed to outer experience such as water.

Alternatively, the holder portion 12 can be individually formed by another primary molding process. In this case, the sensor components molded as described above and the holder portion 12 can be insert-molded together with the secondary molding resin. The main body 13, the flange portion 14, the flange base portion 14*a*, and the holes 18 can be molded in the same manner as described above. In this case, the flange base portion 14*a* can be effectively prevented from the camber or surface sink thereon. Further, the holder contact portions 12*a* in contact with the inner surface of the die 20 for determining the position of the holder portion 12 can be arranged in the same manner as described above. The holder contact portions 12*a* can effectively prevent the holder portion 12 from rattling in the metal made die 20 due to the injection pressure of the secondary molding resin.

According to the embodiments of the present invention, the vehicle speed sensor is formed through the plural molding processes as described above: Alternatively, the vehicle speed sensor can be formed through a single molding process as described below. The holder portion 12 is assembled with the output terminal 6 or is integrated therewith. The sensor IC 2 is connected to the output terminal 6. The holder portion 12 with the sensor IC 2 is then housed in the case 1. At this point, the guiding space 4 is defined between the sensor IC 2 and the case 1. The main body 13 is then integrally molded around the holder portion 12 through the single resin molding process. The resin is guided into the guiding space such that the sensor IC 2 is pushed on the base surface 3.

According to this alternative molding process, it is preferable that the thickness of the holder portion 12 has been pre-designed to be substantially equal relative to each portion of the main body 13. It is further preferable that the thickness of the flange portion 14 is formed to be substantially equal at any portion thereof. Therefore, the time required for cooling the resin can be substantially equal at portions of the molding, thereby enabling to effectively prevent chamber or surface sinks from occurring around the flange portion 14. It is still further preferable that the holder portion 12 is provided with the holder contact portion 12*a* beforehand, thereby enabling to prevent the holder portion 12 from declining or displacing during the single resin molding process.

The principles, embodiments, and modes of operation of the present invention have been described in the foregoing specification and drawings. However, the invention which is intended to be protected is not to be construed as limited to the particular embodiments disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes, and equivalents which fall within the spirit and scope of the present invention as defined in the claims, be embraced thereby.

The invention claimed is:

1. A holding structure of a magnetic sensing member comprising:
   a case possessing a base surface and a predetermined inner surface facing the base surface, the base surface being in contact with the magnetic sensing member;
   a convex portion provided at the predetermined inner surface of the case and holding the magnetic sensing member relative to the base surface, the convex portion defining a guiding space between the magnetic sensing member and the predetermined inner surface of the case during insertion of the magnetic sensing member into the case;
   wherein a primary molding resin is guided into the guiding space upon injection of the primary molding resin into the case while the magnetic sensing member is in contact with the base surface such that the magnetic sensing member is held in the case.

2. A holding structure of a magnetic sensing member according to claim 1, wherein the convex portion is configured to push the magnetic sensing member on the base surface.

3. A holding structure of a magnetic sensing member according to claim 1, wherein the convex portion is at least one rib provided inside the case to push the magnetic sensing member on the base surface.

4. A holding structure of a magnetic sensing member according to claim 1, wherein the guiding space is defined from an opening portion of the case to at least one-half the height of the magnetic sensing member located in the case, the height of the magnetic sensing member is taken along an inserting direction of the magnetic sensing member into the case.

5. A holding structure of a magnetic sensing member according to claim 1, further comprising:
   an auxiliary member inserted into the case and connected to the magnetic sensing member, wherein the convex portion is provided at the auxiliary member to push the magnetic sensing member on the base surface such that the magnetic sensing member is held by the convex portion.

6. A holding structure of a magnetic sensing member according to claim 5, further comprising:
   a contact portion provided at the case,
   wherein the convex portion comes in contact with the contact portion and pushes the magnetic sensing member on the base surface.

7. A holding structure of a magnetic sensing member according to claim 6, wherein the convex portion is an arm portion and the contact portion.

8. A holding structure of a magnetic sensing member according to claim 5, wherein the auxiliary member is inserted into the case substantially integrally with the magnetic sensing member.

9. A molding with the holding structure of a magnetic sensing member, the molding being molded with the primary molding resin according to claim 1, the molding further comprising:
   a main body molded with a secondary molding resin to hold the case;
   a flange portion molded with the secondary molding resin laterally extending from the main body and having an attaching hole; and
   at least one hole formed at a flange base portion of the flange portion.

10. A molding with the holding structure of a magnetic sensing member, the molding being molded with the primary molding resin according to claim 9, the molding further comprising;
 a holder portion molded with the primary molding resin; and
 at least a holder contact portion provided at the holder portion and being in contact with an inner surface of a secondary molding die so as to position the holder portion relative to the main body.

11. A molding with the holding structure of a magnetic sensing member, the molding molded with the primary molding resin according to claim 10, wherein the primary molding resin is the same material as the secondary molding resin.

12. A holding structure of a magnetic sensing member according to claim 1, wherein the convex portion is at least one rib provided inside the case and extending towards the magnetic sensing member.

13. A holding structure of a magnetic sensing member according to claim 12, wherein the at least one rib comprises plural ribs aligned relative to the magnetic sensing member.

* * * * *